United States Patent Office 3,039,879
Patented June 19, 1962

3,039,879
METHOD OF MAKING COTTAGE CHEESE
Demetrius G. Vakaleris, East Islip, N.Y., assignor to National Dairy Products Corporation, New York, N.Y., a corporation of Delaware
No Drawing. Filed Apr. 28, 1960, Ser. No. 25,237
4 Claims. (Cl. 99—116)

The present invention generally relates to a process of manufacturing cottage cheese and more particularly, it relates to an improved process for manufacturing cottage cheese whereby a substantially improved yield is obtained and more rapid manufacture is possible.

Cottage cheese is commercially produced from skim milk which has been pasteurized, a typical cheese-make procedure being the following:

*Step 1.*—Pasteurized skim milk is mixed with suitable starter, such as a lactic acid starter, with rennet being added in order to facilitate the setting of the milk.

*Step 2.*—The milk is allowed to set. In this period, acid is developed in the milk because of the addition of the lactic acid starter. The setting period will normally be more than four hours and setting will be accomplished at a temperature of from 85° F. to 92° F. Alternatively, longer set periods have been employed, for example, 12 to 16 hours, at a temperature of 70° F. to 80° F. when smaller amounts of lactic acid starter are used.

*Step 3.*—After the curd is set, that is, when the curd has formed and is firm, the curd is cut into small pieces; preferably, it is cubed. The time for cutting the curd is determined by the acidity of the whey. Conventionally, the cutting acid is approximately .50 or above at the time the curd is cut.

*Step 4.*—The curd is then cooked, with careful stirring. The cooking is usually carried out at a temperature between about 120° F. and 130° F.

*Step 5.*—The whey is then drained off of the curd and the curd is subjected to several washings with cool water.

*Step 6.*—After washing, the curd is again drained, whereupon it is salted.

The curd is now in substantially finished form and may be packed into containers for storage and for shipping. It is customary to add cream to the curd and it is often added to the containers.

The cottage cheese curd before addition of cream usually has a final pH of between about 4.6 and about 4.7. The uncreamed cottage cheese will analyze; between about 71.4 percent and about 79.9 percent by weight of water, between about 12.7 percent and about 21.1 percent protein, between about 0.4 percent and about 1.9 percent fat and between about 0.2 percent and about 1.1 percent of salt-free ash. The Federal Standards specify a moisture content of less than 80 percent by weight.

Attempts have been made in the past to increase the total yield of solids from the mlik during the manufacture of cottage cheese. In this connection, protein remains in the whey and, accordingly, is not present in the cottage cheese curd as produced. These attempts to increase the total yield of protein in the manufacture of cottage cheese have been largely unsuccessful. In this connection, it has not been found commercially feasible to produce cottage cheese in substantially increased yield while, at the same time, providing cottage cheese of the desired moisture content.

However, a process has now been found which yields substantially increased amounts of cottage cheese solids and which is of high quality. The increase in yield is accomplished by recovering additional protein from the milk and the yield increase is up to about 14 percent. Such increase in yield, of course, reduces the amount of protein in the whey so that it is more readily disposed of and is in better condition for utilization, thereby facilitating the use of the whey in the manufacture of various products, such as syrup, soluble lactate salts, vinegar and other products utilizing deproteinated whey. The discovered process also provides for control of bacteriophage in cottage cheese manufacture.

Accordingly, it is the principal object of the present invention to provide an improved process for the manufacture of cottage cheese. It is a further object of the present invention to provide a process for increasing the total yield of solids from milk during the manufacture of cottage cheese. It is also an object of the present invention to provide a new low protein solids content whey during the manufacture of cottage cheese from milk, which whey can be more readily disposed of or can be used in the manufacture of a by-product. It is another object of the present invention to provide a rapid process for making high quality cottage cheese in substantially increased yield.

Further objects and advantages of the present invention will be apparent from the study of the following detailed description.

The present invention includes the treatment of milk under special conditions of temperature and time to effect a conditioning of the protein in the milk. The milk thus treated is then subjected to a low acid cottage cheese make utilizing a cutting acid in the range from about 0.36 to about 0.4 percent, which provides a curd having a pH in the range of from about 5.0 to about 4.8. The cutting acid is considerably less than the usual cutting acid for cottage cheese make procedures, and the curd pH is substantially higher than that usually provided by conventional cottage cheese make procedures.

More particularly, the present invention comprises subjecting the milk to high temperature treatment which, for purposes of this specification will be referred to as "ultra high" treatment. As used in this specification, such treatment comprises effecting more than about 40 percent denaturation of the milk serum protein. To obtain best results, the serum protein should be denatured to more than about 60 percent. Such denaturation can be accomplished by holding the milk at 260° F. for 12 seconds or at 300° F. for zero time, i.e., bringing the milk up to 300° F. and immediately cooling it. This treatment is known to those skilled in the art and can be practiced with a Roswell type heater. It will be understood that other heat treatments may be used which will effect denaturation of the protein to the desired degree. However, denaturation in excess of about 80 percent usually results in browning, cooked flavor, and adverse conditioning of the protein. Accordingly, the heat treatment of this invention will result in denaturation of from about 40 percent to about 80 percent. This treatment of the milk is to be distinguished from the usual pasteurization treatment. Such treatment does not provide the benefits of this invention.

The heat treated milk is then converted into cottage cheese by setting of the milk and cutting of the resulting curd when the acid has developed into the previously indicated range, which, as indicated, is substantially lower than conventionally used cutting acids. Thereafter, the curd is subjected to the usual operations, such as washing, draining, salting, etc.

In order to aid in establishing the desired moisture content and to assure production of cottage cheese having an analysis within the Federal Standards, calcium chloride may be added during the make procedure. In this connection, a few hundredths of a percent calcium chloride may be added to the milk.

Because of the low acid make procedure and because of the desire for some increased acidity in the end product, it has been found that a desired end product can be provided by culturing the cream which is added to the curd of the invention, as will be pointed out more particularly hereinafter.

Now referring more particularly to the steps of the present invention, the milk is first given the ultra high temperature treatment. This treatment has the effect, as previously indicated, of conditioning the milk serum protein so as to maximize the recovery in the make procedure. Moreover, the treatment has the effect of sterilizing the milk so that bacteria are not available in viable form to deleteriously influence the cottage cheese during the make. In addition, such sterilizing tends to extend shelf life of the end product. The treatment also has the effect of controlling bacteriophage in the cottage cheese manufacture and in the whey.

To the milk is added calcium chloride in an amount of not more than about .02 percent (calculated as anhydrous calcium chloride).

To the milk are added harmless acid producing bacteria and rennet to cause acid development and setting of the milk. The acid producing bacteria are added in a starter, the starter being a usual lactic acid starter. The amount of starter which may be added is in accordance with the skill of the art and conventional amounts are added in accordance with this invention. As is known, the amount of starter added and the rate of growth of the organisms determines, to a considerable extent, the period of setting. Whatever the setting technique during the setting period, the starter organisms increase in the milk at the setting temperature with the production of lactic acid so that the pH of the milk gradually becomes more acid. As before indicated, the acid develops, in accordance with this invention, to a level of between about .36 percent and about .4 percent. When the acidity exceeds the specified range, the resulting clot retains whey very strongly. An insufficient amount of whey is released upon cutting and during cooking. Thus, draining of whey and subsequent washing of the curd are extremely poor. As a consequence, the final curd is excessively wet and pasty. At acid levels below .36 percent, the clot of the milk does not firm to the desired degree, and a soft curd results. Such curd breaks early during cooking and there is excessive loss of fine curd particles. In addition, at lower acid levels, there is a loss of flavor, the curd tends to exhibit rubbery and mealy characteristics, and its keeping quality is adversely affected. Accordingly, the specified range of acidity, which is lower than that used in cottage cheese make procedures, is an important feature of this invention.

The rennet is added at a level of about 1 milliliter per 1000 pounds of milk. At higher levels, the whey expelling characteristics of the curd are impaired and a wet and fragile product results. Accordingly, it is desired that the amount of rennet be less than about 1 milliliter per 1000 pounds of milk.

After setting, the cutting operation is carried out in the usual manner so that the curd is not broken up into fine particles but remains in discrete cubed form. The cut curd is then cooked at higher than conventional temperature (130° to 140° F.) for a suitable period of time. The whey, after the cooking operation, is drained from the curd. This draining is often conducted through strainers to limit the loss of solids. Accordingly, it is important that the curd not clog the straining material. The curd is then washed first with cool water. Several washing steps may be used and usually are used. After washing, the curd is lightly salted. The salted and substantially dry curd is then ready for storage, shipment, and/or immediate use. In conventional practice, the salted curd may be packed into drums by a manufacturer and shipped to a distributor. At the distribution point, the salted curd is placed into individual containers and creamed just before sale. Because the cottage cheese resulting from the make procedure of this invention is somewhat low in acid, the end product acidity can be adjusted by using cultured cream in the creaming operation. The cream is cultured and added to provide a pH for the creamed cottage cheese equivalent to that desired for the product, which acidity can be that obtained when conventional make procedures are employed.

The cottage cheese prepared in accordance with the above described method of the present invention, is of high quality. The improved yield provided by this invention is obtained from the milk treatment step in combination with the particular cottage cheese make procedure. In this connection, it has been found that normal pasteurization temperatures are not suitable, even with the low acid make procedure, for providing the results of this invention.

Example I

Four hundred and fifty-one pounds of cow's skim milk was subjected to ultra high temperature treatment by heating to 260° F. and holding this temperature for 12 seconds. This effected about 75 percent denaturation of the serum protein.

This was accomplished in a Roswell heater. The milk was then cooled to 89° F. and passed to a vat. To the milk was added calcium chloride at a level of .02 percent and a *Streptococcus lactis* starter at a level of 5 percent of the skim milk. After about ninety minutes, rennet was added at a level of about 1 milliliter per 1000 pounds of milk. The milk was maintained in the vat at a temperature of approximately 90° F. and, after about 4 hours and fifteen minutes from the time of addition of the starter, the acid was about .39 percent, curd pH 4.83. At this acid level, the curd was cut and the vat heated until the temperature of the whey was 130° F. The curd was heated to this temperature in about one hour and thirty minutes, and it was held at this temperature for about 15 minutes, and the whey was then drained. The curd was then given three successive wash treatments, two with tap water and one with chilled water at about 45° F.

Simultaneously with the start of the vat, above mentioned, a vat was started with the same amount of pasteurized milk to make cottage cheese by a normal make procedure. Calcium chloride was added, and the same amount and type of starter was added. Likewise, rennet was added at the same time and in like amount. The acid was developed to about .50 percent, but this required about forty-five minutes' additional time. After this acid development, the curd was cut and heated to a temperature of 120° F. within about one hour and thirty-five minutes. Thereupon, the whey was drained and the curd washed as in the case of the curd of the invention. The cottage cheese of the invention and the conventionally made cottage cheese had the following analyses:

| | Cheese of Invention | Conventional Cheese |
|---|---|---|
| Pounds of Cheese | 86.9 | 72.8 |
| Pounds of Solids (dry basis) | 16.34 | 14.58 |
| Percent increase of Yield (Cheese Solids) | 12.8 | |
| Nitrogen in Milk Serum, mg./ml. (Harland & Ashworth Method) | .210 | .710 |
| Total Nitrogen in Whey, mg./ml | .67 | 1.29 |
| Non-protein Nitrogen in Whey, mg./ml | .41 | .40 |
| Total protein Nitrogen in Whey, mg./ml | .26 | 0.89 |
| Whey Protein Nitrogen Recovered in Curd, percent | 70.0 | |

It will be seen that by the practice of the invention there has been a substantial increase in cheese solids, with a corresponding increase in yield, and a substantial decrease in protein in the whey, as reflected by the nitrogen values.

The cheese was salted and to it was added cultured cream, the cream being added at a level of 1 part of cream per 2.5 parts of curd. The cream comprised 14 percent butter fat and had a pH of 4.64. The resultant cream and curd mixture had a pH of 4.88. The creamed curd was indistinguishable in flavor from cottage cheese made by the usual make procedures.

*Example II*

In accordance with this example, the milk is subjected to ultra high temperature treatment by heating it to 300° F. and promptly cooling it to about 90° F. As in the case of the previous example, this is done in a Roswell heater. The resultant milk is made into cottage cheese, in accordance with the procedures set forth in Example I, but an acid of .40 percent is developed. The curd, after cutting, was heated to a temperature of 140° F. in the same time, whereupon the curd was drained, washed and salted. The curd was creamed with sweet cream. The resulting product is also a high quality cottage cheese. The curd had a solids content of more than 20 percent and a yield increase of about 14 percent.

The various features of the invention which are believed to be new are set forth in the following claims.

I claim:

1. A process for the manufacture of cottage cheese which comprises the steps of subjecting the milk to high temperature treatment to effect at least about 40 percent denaturation of the milk serum protein, setting the milk to form cottage cheese curd and whey, said setting being continued until a cutting acid is developed in the range of between about .36 percent and about .40 percent, cutting the curd and cooking the curd, draining the whey from the curd and washing the curd.

2. A process for the manufacture of cottage cheese which comprises the steps of subjecting the milk to high temperature treatment to effect at least about 60 percent denaturation of the milk serum protein, adding not more than .02 percent of calcium chloride to the milk, setting the milk to form cottage cheese curd and whey, said setting being continued until a cutting acid is developed in the range of between about .36 percent and about .40 percent, cutting the curd, cooking the curd, draining the whey from the curd and washing the curd.

3. A process for the manufacture of cottage cheese which comprises the steps of subjecting the milk to high temperature treatment to effect between about 60 percent and about 80 percent denaturation of the milk serum protein, setting the milk to form cottage cheese curd and whey, said setting being continued until a cutting acid is developed in the range of between about .36 percent and about .40 percent, cutting the curd and cooking the curd, draining the whey from the curd and washing the curd, creaming the curd with cultured cream.

4. A process for the manufacture of cottage cheese which comprises the steps of subjecting the milk to high temperature treatment to effect between about 60 percent and about 80 percent denaturation of the milk serum protein, adding not more than .02 percent of calcium chloride to the milk, setting the milk to form cottage cheese curd and whey, said setting being continued until a cutting acid is developed in the range of between about .36 and about .40 percent, cutting the curd, cooking the curd, draining the whey from the curd and washing the curd, creaming the curd with cultured cream.

References Cited in the file of this patent

UNITED STATES PATENTS

| 939,138 | Just | Nov. 2, 1909 |
| 1,711,032 | Richardson | Apr. 30, 1929 |

OTHER REFERENCES

Food Engineering, vol. 28, No. 8, August 1956, pp. 86 and 89.

Disclaimer

3,039,879.—*Demetrius G. Vakaleris*, East Islip, N.Y. METHOD OF MAKING COTTAGE CHEESE. Patent dated June 19, 1962. Disclaimer filed Apr. 13, 1966, by the assignee, *National Dairy Products Corporation*.

Hereby enters this disclaimer to claim 1 of said patent.

[*Official Gazette May 24, 1966.*]